June 1, 1943.  H. S. EBERHARD  2,320,454
TRANSMISSION
Filed July 21, 1941  3 Sheets-Sheet 1
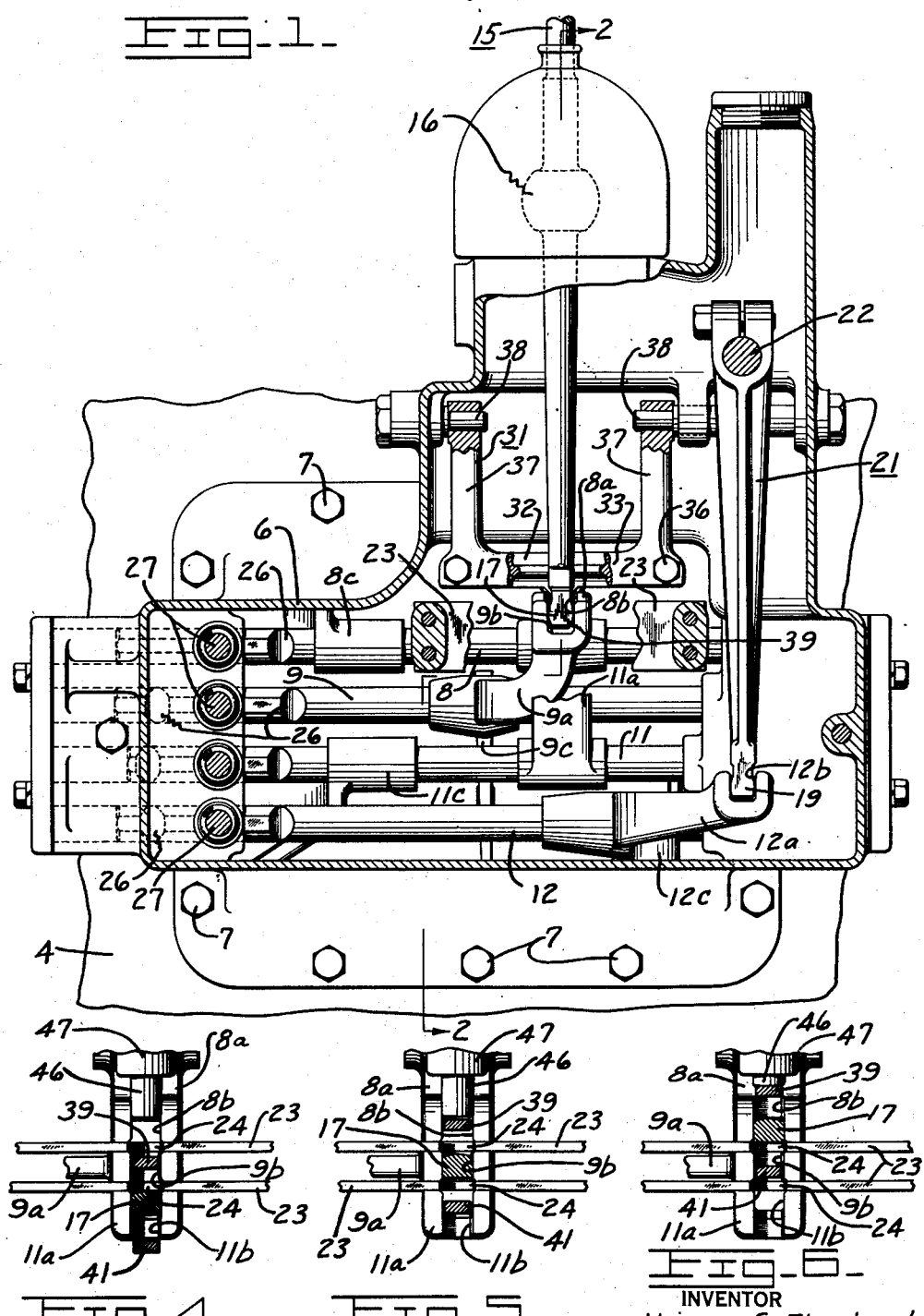
INVENTOR
Harmon S. Eberhard
BY
Charles M. Fryer
ATTORNEY June 1, 1943.　　H. S. EBERHARD　　2,320,454
TRANSMISSION
Filed July 21, 1941　　3 Sheets-Sheet 2
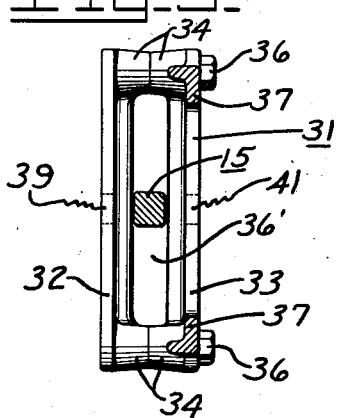
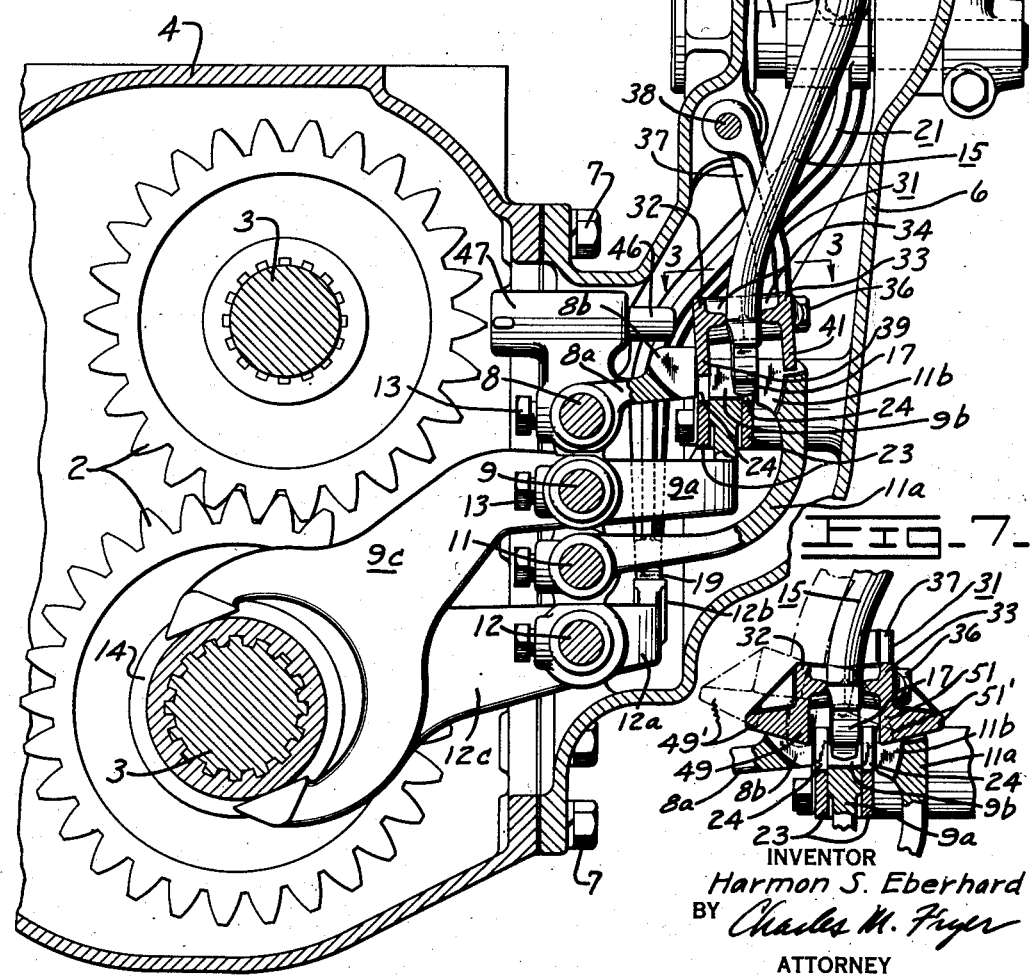
INVENTOR
Harmon S. Eberhard
BY Charles M. Fryer
ATTORNEY June 1, 1943. H. S. EBERHARD 2,320,454
TRANSMISSION
Filed July 21, 1941 3 Sheets-Sheet 3
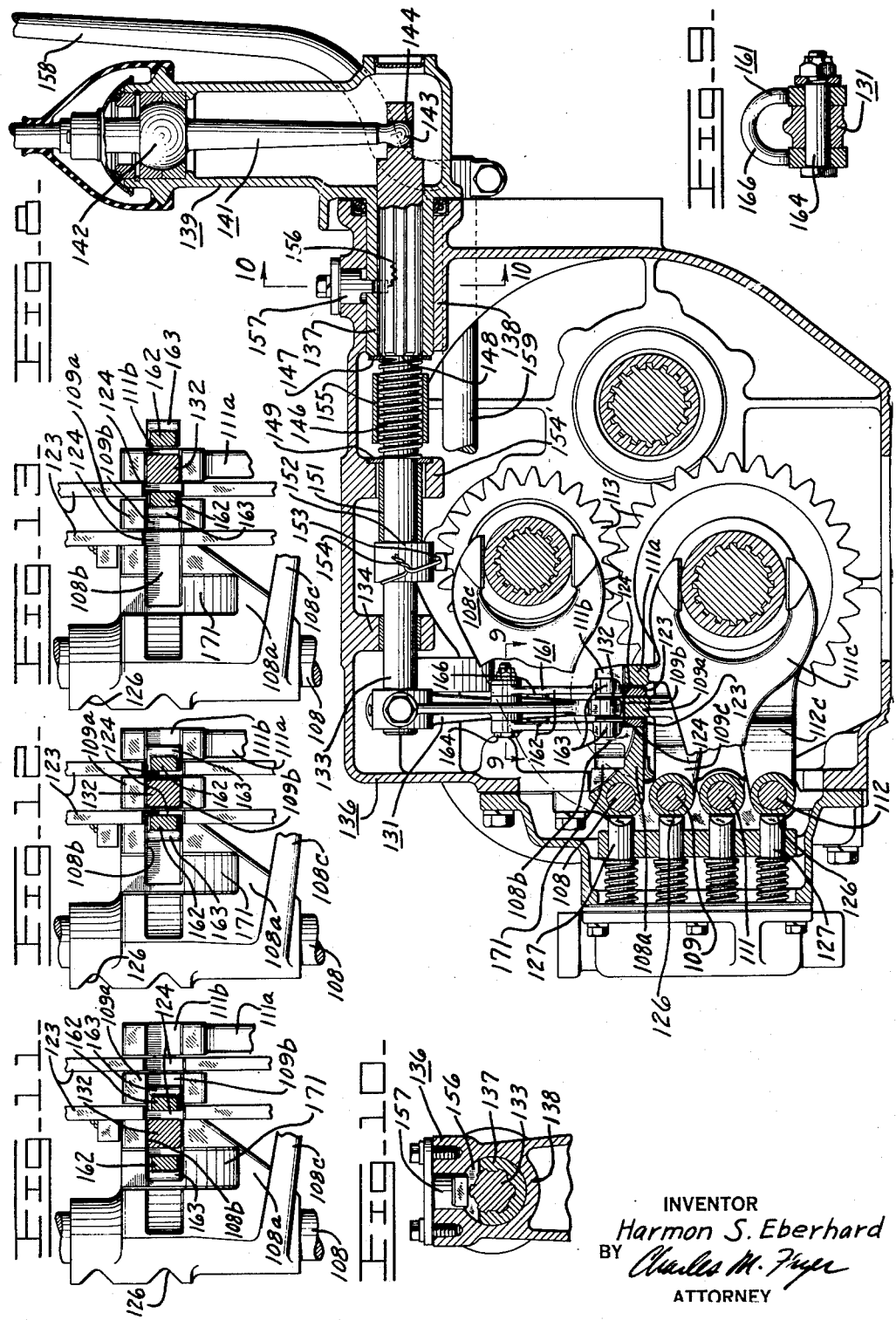
INVENTOR
Harmon S. Eberhard
BY
Charles M. Fryer
ATTORNEY Patented June 1, 1943

2,320,454

UNITED STATES PATENT OFFICE 2,320,454

TRANSMISSION

Harmon S. Eberhard, Peoria, Ill., assignor to Caterpillar Tractor Co., San Leandro, Calif., a corporation of California Application July 21, 1941, Serial No. 403,278

4 Claims. (Cl. 74—477)

My invention relates to transmissions, and more particularly to shift mechanism for speed change transmissions adapted for vehicles, such as tractors.

Transmissions of this character usually comprise a plurality of shiftable gearing to each of which is connected a shift connection. In the neutral position of such gearing, namely, when none of the gearing is engaged to transmit a drive through the transmission, the ends of the shift connections opposite to those connected to the gearing adapted to be shifted, are in transverse or lateral alignment; and such ends are usually slotted or recessed to receive selectively an end of a movable shift control lever which, when engaged with a selected shift connection, is movable longitudinally with respect to such alignment for shifting of such shift connection. Since the slotted ends of the shift connections are all in lateral alignment when the transmission is in neutral, the shift control member must be moved laterally when it is disengaged from one shift connection and engaged with another to move it.

With the transmission gearing engaged so that one set of gearing transmits a drive through the transmission, the end of the associated shift connection engaged with the shift control lever will be longitudinally displaced with respect to the neutral position of such shift connection. Thus, should the operator desire to transmit another drive through the transmission, he must move the shift control lever and the shift connection engaged therewith in a longitudinal direction; and when the engaged shift connection and shift control lever are in neutral position, the shift control lever must be moved laterally out of engagement with the previously engaged shift connection into engagement with the shift connection which it is desired to select. If this operation is conducted too rapidly, the previously engaged shift connection may continue its movement and override the neutral position with the result that the gearing associated therewith might become engaged at the same time as the selected gearing is engaged, which would cause breakdown of the transmission. This problem is particularly burdensome in heavy duty transmissions, such as are employed in track-type tractors, because of the relatively heavy parts that are employed, which have a high inertia.

My invention is designed to overcome this difficulty; and it, therefore, has as its objects, among others, the provision of improved centering mechanism which will insure that a previously engaged shift connection will remain in neutral position when the shift control member is moved out of engagement therewith and into engagement with another of such shift connections, which permits of a construction enabling non-engaged shift connections to be positively locked against movement in neutral position while permitting shifting of a shift connection engaged with the shift control member, and which is of relatively simple and economical construction. Other objects of my invention will become apparent from a perusal of the following description.

Referring to the drawings:

Fig. 1 is a side sectional elevation of a form of transmission shift mechanism embodying my invention; parts being shown broken away and in section to illustrate more clearly the construction.

Fig. 2 is a vertical section taken in planes indicated by line 2—2 in Fig. 1.

Fig. 3 is a section taken in a plane indicated by line 3—3 in Fig. 2.

Fig. 4 is a fragmentary sectional plan view showing one position of the centering mechanism of my invention, in the embodiment of Figs. 1 through 3.

Fig. 5 is a view similar to Fig. 4 illustrating another position of such centering mechanism.

Fig. 6 is a view also similar to Fig. 4 showing still another position of such centering mechanism.

Fig. 7 is a fragmentary vertical section of a modification of the construction illustrated in Figs. 1 through 6.

Fig. 8 is a sectional view of another form of transmission control mechanism employing another embodiment of the centering mechanism of my invention.

Fig. 9 is a section taken in a plane indicated by line 9—9 in Fig. 8.

Fig. 10 is a section taken in a plane indicated by line 10—10 in Fig. 8.

Fig. 11 is a fragmentary sectional plan view showing one position of the centering mechanism of my invention, in the embodiment of Figs. 8 through 10.

Fig. 12 is a view similar to Fig. 11 illustrating another position of such centering mechanism.

Fig. 13 is a view also similar to Fig. 11 showing still another position of such centering mechanism.

The centering mechanism of my invention is applicable to any type of transmission shift mechanism having a plurality of shift connections which have elements in alignment when the transmission is in neutral, and in which a control member is movable in one direction to engage a selected element and movable in another direction to shift the gearing associated with an engaged element. I have chosen, for purposes of illustrating my invention, a form of transmission described in my co-pending application, Serial Number 367,237, for "Transmission," filed November 26, 1940. Such transmission is provided with shiftable gearing 2 controllable by a single control lever to establish any one of five different gear ratios through the transmission; and independently controllable reversible gearing is provided for selectively establishing either a forward or reverse drive for each of a plurality of such gear combinations. Only a portion of the shiftable gearing 2 is shown in the drawings herein.

Gearing 2 is mounted on shafts 3 in transmission case or housing 4. In an extension control housing 6 fixedly attached to a side of case 4 by cap screws 7, are a plurality of axially slidable shift shafts 8, 9, 11 and 12. Shafts 8, 9 and 11 have, respectively, fixedly secured thereto, by set screws 13, arms 8a, 9a and 11a which have, respectively, in their upper ends open sided slots 8b, 9b and 11b which are also open at the top. As can be seen from Fig. 2, arms 8a, 9a and 11a are so shaped that their respective slots 8b, 9b and 11b are all in transverse or lateral alignment with respect to the axes of shafts 8, 9 and 11, in the neutral position of the transmission gearing. To shift shafts 8, 9 and 11 are also, respectively, fixedly secured the usual shift forks 8c, 9c and 11c, which have their forked ends loosely engaging in suitable grooves 14 formed in the axially shiftable transmission gearing.

Each of shift shafts 8, 9 and 11 and the arm and the fork associated therewith form a shift connection movable longitudinally or back and forth, by virtue of the axially slidable mounting of such shift shaft, to enable shifting of the gearing associated therewith for establishment of a selected drive through the transmission. In the neutral position of such shift connections, namely, when their slot elements 8b, 9b and 11b are in transverse alignment, they are adapted to be engaged by shift control lever 15, universally mounted by any suitable ball and seal structure 16, and having flattened finger end 17 adapted to engage in any one of such slots 8b, 9b and 11b. As is described more fully in my previously mentioned co-pending application, shift shaft 12 is movable longitudinally or axially by an independent auxiliary control lever 18, for establishment of a forward or reverse drive for any one of a plurality of gear combinations selected by control lever 15. For this purpose, shaft 12 has fixedly secured thereto arm 12a provided with slot 12b, and shift fork 12c connected to move the reversible gearing (not shown herein).

Slot 12b opens upwardly; and always engaged therein, is the lower end 19 of a lever 21 fixedly secured to a rock shaft 22 journaled in the upper part of extension housing 6. Auxiliary lever 18 is fixedly secured to rock shaft 22 outside of housing 6; and hence forward or backward movement of lever 18 will effect movement of the gearing associated therewith, for the purpose explained. Auxiliary control lever 18 and the shift mechanism controllable thereby have no relationship to the centering mechanism of my invention to be subsequently described, but they are referred to as they form part of the type of transmission chosen for the purpose of illustrating my invention.

By virtue of the universal mounting of shift control lever 15, it is apparent that its finger 17 may be moved laterally in the neutral position of shift connection elements 8b, 9b and 11b, to engage, selectively, any one of such elements; and when engaged with a selected element it may be moved longitudinally to shift the shift connection associated with such engaged element. In this connection, the central shift connection element 9b is located between spaced guides 23 fixed to extension control housing 6, and having opposite slots 24 which are in lateral alignment with each other and with slot elements 8b, 9b and 11b in the neutral position of the shift connections. The sides of guides 23 serve as guide rails for finger 17 when it is moved longitudinally; and the slots 24 permit lateral shifting of finger 17 through the guides 23. Also, should finger 17 be in such position that it engages in both of slots 8b and 9b, or 9b and 11b, it will be apparent that the guide 23 between such adjacent slots will preclude longitudinal movement of lever 15, to thereby obviate damage which would occur by simultaneous shifting of more than one of the shift connections.

As is employed in conventional constructions, shift shafts 8, 9 and 11 are each provided with a plurality of axially spaced wedge-shaped recesses or notches 26, each of which is adapted to receive in latching engagement an associated spring mounted plunger 27 having a suitably formed wedge-shaped end to engage in such notches. The notches on each shift shaft are so spaced as to engage an associated plunger in the neutral position of the shift connection associated with such shift shaft, and in axially shifted positions thereof when the gearing shiftable thereby is in mesh in the transmission. In heavy duty transmissions, such as are employed in relatively large track-type tractors, the gearing and associated shift connections may be so heavy that when an engaged gear is shifted longitudinally to neutral position, and the shift control lever moved laterally to engage another shift connection, plunger latching mechanism of the type just described, is not strong enough to preclude the previously engaged shift connection from moving longitudinally past neutral position because of the inertia of such heavy mass.

For example, should finger 17 of shift control lever 15 be in engagement with the shift connection slot element 11b, with such slot element out of neutral position, so that the gearing associated therewith is engaged in the transmission, and should the operator desire to select another gear for another speed, he must move the shift connection associated with slot element 11b in a longitudinal direction to the neutral position, and then shift finger 17 laterally out of engagement with slot element 11b and into engagement with either of slot elements 8b or 9b. If the shifting is quite rapid, the shift connection associated with slot 11b might very readily override the neutral position, as soon as finger 17 is disengaged from slot 11b. This would cause very serious damage to the transmission should the gearing associated with slot 11b mesh with other gearing in the transmission.

The centering mechanism of my invention, which I employ in addition to the non-locking plunger mechanism 26, 27, obviates such possibility, by insuring that a slot element of a shift connection previously engaged by shift control lever 15 will remain in neutral position when such lever is moved out of engagement therewith and into engagement with another slot element of another shift connection. Such centering mechanism 31 comprises gate parts 32 and 33 having abutting end bosses 34 containing cap screws 36 fixedly securing parts 32 and 33. An elongated slot or opening 36' is thus formed between gate parts 32 and 33, the ends of which are closed by bosses 34. One of such parts 33 is formed with upwardly extending arms 37 pivotally mounted within control housing 6 on pivot shafts 38, the axes of which are in alignment and extend longitudinally with respect to the transverse alignment of slot elements 8b, 9b and 11b in neutral position. Control lever 15 extends through slot 36' which also extends longitudinally. The described pivotal mounting of centering mechanism 31 and the arrangement thereof with respect to shift control lever 15 and the shift connection elements 8b, 9b and 11b permit the centering mechanism to move transversely with shift lever 15, when the latter is moved laterally in the neutral position, in and out of engagement with the various shift connections. At the same time, shift lever 15 can be moved longitudinally irrespective of the shift connection element 8b, 9b or 11b with which it may be engaged, while the centering mechanism is fixed against such longitudinal movement.

Gate part 32 has medially thereof a downwardly extending lug 39 spaced from one side of lever 15, while gate part 33 has a similar lug 41 in lateral alignment with lug 39 and spaced from the opposite side of lever 15; both of lugs 39 and 41 being in alignment with slot elements 8b, 9b and 11b in the neutral position thereof. The width of lugs 39 and 41 is such that they may pass easily in slots 8b, 9b and 11b, and also slots 24 in guides 23. Thus, it is seen that when finger 17 of lever 15 is engaged in any one of slots 8b, 9b or 11b, and it is desired to move such finger into engagement with another slot, lugs 39 and 41 will not interfere with such movement when all of the shift connection elements 8b, 9b and 11b are laterally aligned in neutral position. In this connection, the lateral spacing between each of lugs 39 and 41, and finger 17 is such that when finger 17 is moved laterally out of engagement with any one of elements 8b, 9b or 11b with which it may be engaged, either of lugs 39 or 41, depending upon the direction of lateral shifting of lever 15, will engage such element before the shift member 15 is completely disengaged therefrom.

In operation, should finger 17 be engaged, for example, in slot 9b, as is illustrated in Fig. 5, lug 39 will engage in slot 8b, and lug 41 will engage in slot 11b. Hence, the shift connection associated with slot 9b may be moved longitudinally to shift the gearing shiftable thereby. At the same time, the shift connections associated with slots 8b and 11b can not be accidentally displaced because they are held or positively locked against such displacement by lugs 39 and 41; the centering mechanism 31 being fixed against longitudinal movement, as was previously pointed out. Should the shift connection associated with slot 9b be longitudinally displaced from neutral position so that the gearing connected thereto be engaged in the transmission and should such connection be moved longitudinally back to neutral, and finger 17 moved out of engagement with slot 9b to engage slot 8b, for shifting of the shift connection associated with slot 8b, lug 41 will enter slot 9b before finger 17 leaves slot 9b, because of the described spacing between lugs 39 and 41, and finger 17. As a result, the shift connection associated with slot 9b must remain in neutral during such shifting and hence can not overrun the neutral position. Similarly, when finger 17 is moved out of engagement from slot 9b to engage slot 11b during shifting of the transmission mechanism, lug 39 will enter slot 9b before finger 17 leaves slot 9b. The reverse effect will also obtain because, it will become apparent from Fig. 4, that when finger 17 is moved out of engagement from slot 11b into engagement with slot 9b during shifting of the transmission mechanism, lug 41 will enter slot 11b before finger 17 leaves slot 11b. Also, from Fig. 6, it will be apparent that when finger 17 is moved out of engagement from slot 8b into engagement with slot 9b, the lug 39 will enter slot 8b before finger 17 leaves slot 8b.

From the preceding, it will be apparent that when finger 17 of shift lever 15 is moved out of engagement with the slot element of any one of the shift connections, into engagement with the slot element of a next adjacent shift connection, either of lugs 39 or 41, depending on the lateral direction of movement, will positively maintain the previously engaged shift connection locked in neutral. However, in the embodiment of the invention illustrated in Figs. 1 through 6, unless the slot element 9b of the central shift connection is engaged by finger 17 for shifting thereof, all of the other shift connections will not be locked. Thus, as can be seen from Fig. 4, when finger 17 engages in slot 11b, the shift connection associated with slot 8b will be unlocked; and referring to Fig. 6, when finger 17 engages the shift connection associated with slot 8b, the shift connection associated with slot 11b will be unlocked. But, this will not preclude the centering mechanism 31 from insuring that when finger 17 is moved out of engagement from a slot associated with one shift connection into engagement with a slot associated with any of the other shift connections during shifting of the transmission gearing, the previously engaged shift connection will not override neutral. This is so because, as can be seen from Fig. 4, for example, should it be desired to shift finger 17 out of engagement with slot 11b into engagement with slot 8b, lug 41 must still enter slot 11b before finger 17 leaves slot 11b. Therefore, any longitudinal momentum of the shift mechanism associated with slot 11b must terminate before lug 41 leaves slot 11b, as the finger 17 of shift control lever 15 is moved laterally until it enters slot 8b.

In the transmission chosen for purposes of illustration, high speed is when finger 17 of shift lever 15 engages in slot 8b to shift the gearing associated therewith. In such position, gate part 32 is adapted to be thrust against a spring pressed plunger 46 slidably mounted in a bracket 47 integral with arm 8a. The purpose of such spring pressed plunger 46 is to indicate to the operator when the transmission gearing is being shifted to high speed position; as the resistance which such spring pressed plunger offers requires more effort on the part of the operator to shift into high speed position than into the other transmission speed positions.

The centering mechanism of the modification illustrated in Fig. 7, is substantially identical in all respects to that previously described with respect to Figs. 1 through 6, except that instead of having straight depending lugs 39 and 41, lugs 49 and 51 are formed on gate parts 32 and 33, respectively, which are of such character as to have laterally extending wings 49' and 51'. As a result, when finger 17 is engaged with either of end slot elements 8b or 11b, as is illustrated by the phantom line position, wings 51' and 49', respectively, will engage the remaining slot elements. Hence, all of the shift connections will be positively locked in neutral position at all times, with the exception of the shift connection engaged for shifting by control shift lever 15. This arrangement is more desirable than the arrangement of Figs. 1 through 6 because it positively precludes accidental movement from neutral position of either of the shift connections associated with slots 8b or 11b when one of such shift connections is engaged by lever 15, which accidental shifting might otherwise occur as a result of jarring of the machine in which the transmission is associated or vibration of the transmission gearing.

In the modifications just described, the centering mechanism 31 is pivotally mounted on the transmission case and is movable laterally by engagement with shift control lever 15. Figs. 8 through 13 illustrate another form of centering mechanism, wherein the principle is the same as that described, but which is pivotally mounted on a shift control member for lateral movement therewith. The transmission gearing and associated shift connections of the modification of Figs. 8 through 13 are essentially the same as that previously described. Therefore, to shorten the description, such modification will be described primarily with respect to the features wherein it differs from the previously described modifications.

Instead of axially slidable shift shafts, the transmission of Figs. 8 through 13 has stationary shafts 108, 109 and 111 which, respectively, carry for axially slidable longitudinal movement, shift forks 108c, 109c and 111c. Such forks have integral therewith upwardly extending arms 108a, 109a and 111a, respectively, formed with slots 108b, 109b and 111b, respectively, which are in transverse alignment in the neutral position of the shift connections associated therewith. Forks 108c, 109c and 111c are connected to axially shiftable transmission gearing 113. As with respect to the previously described modifications, arms 108a, 109a and 111a are associated with spaced stationary guides 123 having slots 124 in transverse alignment with each other and with slots 108b, 109b and 111b in the neutral position of the shift connections. Spaced V-shaped notches 126 are formed in the hubs of forks 108c, 109c and 111c to permit engagement therein of spring pressed plungers 127 having the same purpose as plunger 27 and notches 26 of the previously described modifications.

Longitudinal shifting movement of the shift connections associated with each of slot elements 108b, 109b and 111b is effected by control lever 131 having finger 132 adapted to engage selectively in the various slots. Instead of being laterally movable by a pivotal mounting, as is the case with control lever 15 of the previously described modifications, control lever 131 is fixedly mounted on an axially movable rock shaft 133; so that lever 131 may be bodily moved laterally to oscillate or swing in various parallel planes. This is accomplished by axial movement of rock shaft 133 until finger 132 engages in the selected one of slots 108b, 109b and 111b, whereupon rocking of shaft 133 results in longitudinal movement of the shift connection associated with the slot element engaged by finger 132.

Adjacent the end to which control lever 131 is fixedly secured, rock shaft 133 is journaled in boss 134 depending from the top of case 136. Near its opposite end, shaft 133 is splined for non-rotatable but axially slidable movement within a sleeve 137 journaled in bearing 138 at the top of transmission case 136; such sleeve forming a lateral extension integral on upwardly extending housing 139 for the main shift control lever 141 which is provided with a suitable universal mounting 142 in the top of housing 139. At its lower end, lever 141 is provided with a ball 143 universally engaging a suitable socket 144 in the end of rock shaft 133 opposite to the end to which lever 131 is secured. Thus, by moving control lever 141 in a longitudinal direction, housing 139 may be turned to rock, rock shaft 133 in the desired direction; and by moving lever 141 laterally, rock shaft 133 may be shifted axially to enable selection of finger 132 with the desired one of slots 108b, 109b and 111b.

For urging rock shaft 133 to a central position after it has been released from a laterally shifted position, a spring 146 is provided about shaft 133, which is compressed at one end against a collar 147 abutting a shoulder 148 formed adjacent the splines on shaft 133, and which is also adapted to abut sleeve 137. At its opposite end, spring 146 abuts a second collar 149 abutting sleeve 151 engaging abutment collar 152 fixedly secured to shaft 133 by set screw 153 locked by means of wire 154; collar 149 being also adapted to abut boss 154' depending from the top of case 136. A sleeve 155 of predetermined length, is positioned about spring 146 to provide means for limiting endwise movement of rock shaft 133 in either direction so that finger 132 will assume a proper position for engagement in either of end slots 108b and 111b. To preclude endwise displacement of sleeve 137, it is formed with a slot 156 in a portion of the periphery thereof in which is engaged a key 157 detachably secured to the top of case 136.

As in the previously described modifications, an auxiliary shift lever 158 is provided to shift reversible gearing by means of a rock shaft 159 and a shift fork 112c slidably mounted for axial movement on shaft 112. A suitable connecting means (not shown) is provided between fork 112c and rock shaft 159.

From the preceding, it is seen that the shift connections to the shiftable transmission gearing are shiftable in the same way as the shift connections in the modifications previously described, namely by engagement of finger 132, on control lever 131, in the desired one of slot elements 108b, 109b and 111b obtained by laterally positioning control lever 131 in the proper plane, and then moving it longitudinally in such plane. Centering mechanism 161 is supported directly on lever 131. Such centering mechanism comprises a pair of depending arms 162, one at each side of lever 131, which have at their lower ends lugs 163 having the same spaced relationship with respect to finger 132 and slots 108b, 109b and 111b, as was described previously with respect to lugs 39 and 41. Thus, when lever 131 is moved laterally, to disengage finger 132 from any one of slots 108b, 109b and 111b, a lug 163 will enter the slot being disengaged before finger 132 completely leaves such slot.

So as not to impede or interfere with longitudinal movement of lever 131, when it is engaged in any one of shift connection elements 108b, 109b and 111b, arms 162 are pivotally mounted on pivot shaft 164 supported on lever 131, the axis of which extends transversely with respect to the direction of longitudinal movement of lever 131 and also parallel to the line of lateral alignment of slots 108b, 109b and 111b in the neutral position thereof. As can be seen more clearly from Fig. 9, arms 162 are tied together by yoke member 166 integral with such arms, thus causing such arms to be fixed always in lateral alignment.

It will be noted from Figs. 8, 11, 12 and 13 that each of lugs 163 is wide enough, so that at least one of such lugs will always be locked against longitudinal movement in a slot 124 of a guide rail 123. Hence, even though lever 131 is moved longitudinally, the centering mechanism arms 162 can not move longitudinally therewith but will be always fixed in the neutral position. Figs. 11, 12 and 13 correspond, respectively, to the positions described with respect to Figs. 4, 5 and 6; and from Figs. 11, 12 and 13, it is readily apparent how the centering mechanism functions in the various laterally shifted positions of control lever 131. In this connection, arm 168a is provided with an elongated longitudinally extending passage 171 adjacent slot 168b to accommodate the left-hand lug 163, appearing in Figs. 8 through 13, when finger 132 is engaged in slot 168b. The slotted portion in arm 168a at the left of passage 171 performs no function but is formed incidentally in machining during formation of slot 168b.

I claim:

1. A transmission comprising a plurality of shiftable gearing for establishing any one of a plurality of drives through said transmission, a plurality of movable shift connections connected to said gearing and having slotted elements which when said transmission is in neutral are adjacent each other in lateral alignment, a shift lever movable laterally in the direction of said alignment and having a finger to engage selectively in the slot of each element, said shift lever being also movable longitudinally with respect to said alignment for shifting such engaged element and the shift connection associated therewith, centering mechanism including a member secured for lateral movement with the shift lever and pivotally mounted about an axis extending laterally whereby said member will move laterally with said shift lever while allowing longitudinal movement of said shift lever, said member having a lug for entering the slot of an element from which said finger is disengaged when the shift lever is shifted laterally, and a guide between adjacent elements having a slot in lateral alignment with the slots of such elements when they are in neutral position and in which the lug of said member is adapted to engage for holding said member against longitudinal movement with said shift lever.

2. Shift mechanism for a transmission having a plurality of shiftable gearing for establishing any one of a plurality of drives through the transmission, comprising a plurality of movable shift connections connected to such gearing and having elements adapted to be in lateral alignment when the transmission is in neutral, each of such elements being movable longitudinally with respect to said alignment to shift the gearing associated therewith, a shift member movable laterally in the direction of alignment to engage selectively each of said elements and also movable longitudinally with respect to said alignment to shift the connection associated with an engaged element, centering mechanism including an arm secured for lateral movement with the shift member and pivotally mounted about an axis extending laterally whereby the arm will move laterally with the shift member while allowing longitudinal movement of the shift member, the arm being adapted to engage an element from which the shift member is disengaged when it is shifted laterally, and a guide between adjacent elements having means in lateral alignment with said elements when they are in neutral position and which said arm is adapted to engage for holding the arm against longitudinal movement with the shift member.

3. In a transmission having a plurality of slotted elements connected to movable gear shift connections and which are adapted to be in lateral alignment when the transmission is in neutral; a shaft member movable laterally in the direction of such alignment to engage selectively in the slot of each element and also movable longitudinally with respect to said alignment for shifting such engaged element longitudinally; and mechanism associated with the shift member for insuring that a previously engaged element will remain locked in neutral position when the shift member is moved out of engagement therewith and into engagement with a next adjacent one of such elements including an arm secured for lateral movement with the shift member and pivotally mounted about an axis extending laterally whereby the arm will move laterally with the shift member while allowing longitudinal movement of the shift member, the arm being adapted to engage in the slot of such previously engaged element before the shift member is completely disengaged therefrom and remain in such slot after the shift member is completely engaged with said next adjacent element, and a guide between adjacent elements having a slot in lateral alignment with the slots of such elements when they are in neutral position and in which said arm is adapted to engage for holding the arm against longitudinal movement with the shift member.

4. In a transmission having a plurality of slotted elements connected to movable gear shift connections and which are adapted to be in lateral alignment when the transmission is in neutral; a shift member movable laterally in the direction of such alignment to engage selectively in the slot of each element and also movable longitudinally with respect to said alignment for shifting such engaged element longitudinally; and mechanism associated with the shift member for insuring that a previously engaged element will remain locked in neutral position when the shift member is moved out of engagement therewith and into engagement with a next adjacent one of such elements including an arm secured for lateral movement with the shift member and pivotally mounted about an axis extending laterally whereby the arm will move laterally with the shift member while allowing longitudinal movement of the shift member, the arm being adapted to engage in the slot of such previously engaged element before the shift member is completely disengaged therefrom and remain in such slot after the shift member is completely engaged with said next adjacent element, and a member between such adjacent elements having a slot in lateral alignment with the slots of such elements when they are in neutral position and in which the arm is adapted to engage to hold the arm against longitudinal movement with the shift member.

HARMON S. EBERHARD.